(12) United States Patent
Lekutai

(10) Patent No.: US 8,107,935 B2
(45) Date of Patent: Jan. 31, 2012

(54) METHODS AND SYSTEMS FOR ONE-TO-MULTIPLE EMERGENCY CALL COMMUNICATION

(75) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 407 days.

(21) Appl. No.: 12/195,721

(22) Filed: Aug. 21, 2008

(65) Prior Publication Data

US 2010/0048160 A1 Feb. 25, 2010

(51) Int. Cl.
*H04M 3/42* (2006.01)
(52) U.S. Cl. ............... 455/414.2; 455/404.1; 455/414.1
(58) Field of Classification Search ............... 455/404.1, 455/414.1, 414.2
See application file for complete search history.

(56) References Cited

U.S. PATENT DOCUMENTS

| | | | |
|---|---|---|---|
| 6,112,075 A | 8/2000 | Weiser | 455/404 |
| 7,844,034 B1* | 11/2010 | Oh et al. | 379/45 |
| 2005/0053209 A1* | 3/2005 | D'Evelyn et al. | 379/111 |
| 2006/0040639 A1 | 2/2006 | Karl et al. | 455/404.1 |
| 2008/0005301 A1* | 1/2008 | Li et al. | 709/223 |
| 2008/0226039 A1* | 9/2008 | Goldman et al. | 379/45 |
| 2008/0299941 A1* | 12/2008 | Stephens, Jr. | 455/404.2 |
| 2008/0304630 A1* | 12/2008 | Nguyen et al. | 379/45 |
| 2009/0154659 A1* | 6/2009 | Morin | 379/48 |
| 2010/0003961 A1* | 1/2010 | Ray et al. | 455/404.2 |

* cited by examiner

*Primary Examiner* — Barry Taylor
(74) *Attorney, Agent, or Firm* — Woodcock Washburn LLP

(57) ABSTRACT

Systems and methods for contacting associated parties in the event of an emergency communication is described. When an emergency request is made, such as a "911" call, the system determines if other contacts are associated with the requestor or the requesting device. The system then sends a communication to the associated contacts. The system may bridge the contacts onto an emergency call, provide them with information regarding the emergency, or provide them with the means to obtain more information, such as a link or a telephone number. The system may detect an incoming call and determine if the caller is associated with an ongoing emergency situation, connecting the caller with the relevant authorities if necessary.

21 Claims, 8 Drawing Sheets

METHODS AND SYSTEMS FOR ONE-TO-MULTIPLE EMERGENCY CALL COMMUNICATION

TECHNICAL FIELD

The technical field generally relates to communications systems and more specifically relates to providing communication services to multiple parties during an emergency call.

BACKGROUND

Quick access to emergency services providers via telephone, for example, by dialing "911", greatly increases the chances of survival and reduces the chances of injury in the event of an emergency. A call to an emergency services provider may also help reduce monetary loss and property damage. Emergency services providers, such as police departments, fire departments, hospitals, and similar entities, can often reach a person in need of assistance or a location of an emergency relatively quickly after receiving a call. In the meantime, emergency services providers can often guide a person in need of safety to a safe area or help them take steps to alleviate problems over the telephone, while emergency services personnel are in transit to the emergency site.

Unfortunately, a person who places an emergency call may be unable to communicate over the telephone due to an injury or other reason. There also may be information about the person placing the emergency call that may be helpful to emergency services providers. This information may be known by relatives, friends, or others familiar with the person placing the emergency call. There may also be other parties, such as friends or relatives, that a person who places an emergency call may wish to contact in the event of an emergency. However, the situation may not allow the person time to contact anyone other than an emergency services provider, or the person may be unable to do so.

SUMMARY

In view of the above shortcomings and drawbacks, methods, systems, and devices for contacting associated device and parties upon receipt of an emergency request are provided herein. In one embodiment, an emergency request is recognized and a determination is made as to whether there are contacts or devices associated with the device or user sending the emergency request. If so, communications of any useful form may then be sent to the associated users or devices. These communications may take the form of voice, text, or instant messages, or any other effective form of communication. The communications may include a telephone number, a link to a webpage, the geographical location of the device requesting emergency assistance, or any other useful information. In one embodiment, a telephone number is provided which, when dialed, will connect the associated party or device to the emergency call in progress. In another embodiment, a voice call is placed which, when picked up by the associated device or party, will connect the associated device or party to an emergency call in progress. In another embodiment, a link is provided which, when activated, will direct the associated device to a webpage containing more information about the emergency situation, such as the location of the device requesting emergency assistance.

In another embodiment, methods, systems, and devices are provided herein for detecting an incoming call and determining if the calling device or party is associated with an ongoing emergency situation. If so, in one embodiment, the incoming call is connected to an ongoing emergency call. In another embodiment, the incoming call is connected to an operator or emergency services personnel.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings.

DETAILED DESCRIPTION

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the discussion that follows, details relating to wireless devices and networks are assumed to be known to those skilled in the art. Accordingly, such details are largely omitted herein for the sake of clarity and explanation. In addition, any references herein to an example embodiment involving a cellular telephone are used solely for purposes of explanation, and are not intended to limit the invention to any such embodiment. For example, a wireless device as contemplated by various embodiments of the invention may include, but is not limited to: cellular telephones, personal digital assistants (PDAs), email devices, portable and non-portable computers, and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA, and other standards now known or to be developed in the future. Likewise, any references herein to an embodiment using GPS location technology are for purposes of explanation, as any type of location technology, whether currently available or to be developed in the future, is compatible with an embodiment.

Figure 1:
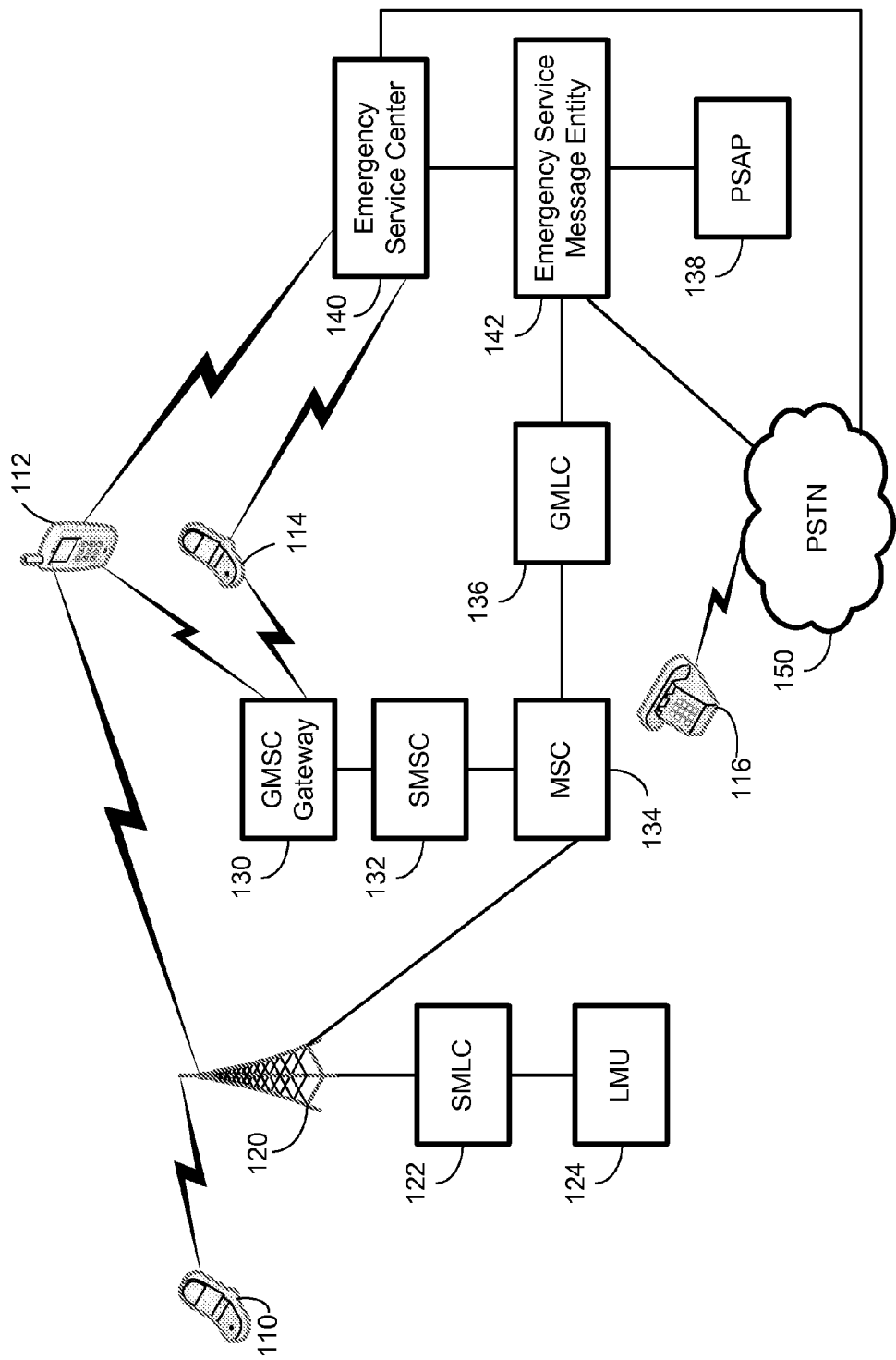
FIG. 1 is a block diagram of a non-limiting, exemplary communication system and devices in which the present systems and methods may be implemented.

FIG. 1 illustrates a non-limiting, exemplary system for providing one-to-multiple emergency communications. Device 110 may be operated by a user who is in an emergency situation. Device 110 may be any type of wireless communications device, some embodiments of which are as described herein, or any other type of communications device capable of placing an emergency call. For example, it is contemplated that device 110 may be a mobile telephone, PDA, portable computer, GPS system, or any other wireless communications device. Alternatively, it is contemplated that device 110 may be a wired telephone, home computer, or any other type of wired communications device. Any device that is capable of placing an emergency call is contemplated as within the scope of the present disclosure.

The emergency call placed using device 110 may be a traditional emergency call initiated by dialing "911" on device 110. Alternatively, the emergency call placed may be initiated using a dedicated or configurable input or button on device 110. Such an input or button may be configured in either hardware or software, and may be configured at the time of manufacture of the device or may be user-configurable. Any control, button, or any other form of input or any combination of inputs that may be configured to initiate an emergency call on a communications device are contemplated as within the scope of the present disclosure.

Alternatively, an emergency text message or other form of communication may be sent from device 110. Alternate forms of communication, such as text messages, instant messages, emails, short message service (SMS) messages, multimedia message service (MMS) messages, and any other communication capable of conveying the need for emergency assistance are contemplated as within the scope of the present disclosure.

In one embodiment, an emergency call or message transmitted from device 110 may be received at network 120. Network 120 may be a wired or wireless network of any type, non-limiting examples of which are described herein. Any form of telecommunications, voice, or data network, or any combination of such networks, may be present in network 120.

In one embodiment, network 120 includes Serving Mobile Location Center (SMLC) 122. SMLC 122 may be integrated into a Base Station Controller (BSC) or may be a separate device. As is known to those skilled in the art, SMLC 122 may provide location services. SMLC 122 may be configured to operate with Location Measurement Unit (LMU) 124. As is known to those skilled in the art, LMU 124 may use various means and methods to determine the location of a device, such as device 110. SMLC 122 and/or LMU 124 may be configured to operate with various device-locating devices, such as GPS equipment, triangulation equipment, or any other equipment or devices that may be used to locate a device. Alternatively, SMLC 122 and/or LMU 124 may be configured to perform locating functions using any known locating technology, means, or methods. Any location-determining technology, means, or methods, and any combination thereof, are contemplated as within the scope of the present disclosure. A location determined by SMLC 122, LMU 124 and/or related equipment may be used as described in more detail herein.

The emergency communication transmitted from device 110 may be processed by Mobile Switching Center (MSC) 134. The functions of MSC 134, as well as the functions of other network equipment that may be used within or in conjunction with network 120, are described in more detail herein in regards to FIGS. 6-8. In one embodiment, the emergency communication may also be processed by Gateway Mobile Location Center (GMLC) 136, which may perform locating services as described herein. Like SMLC 122, GMLC 136 may operate with, or be configured to perform the tasks of, any location-determining technology, means, or methods, and any combination thereof. A location determined by GMLC 136 and/or related equipment may be used as described in more detail herein.

In one embodiment, the emergency communication is processed by Emergency Service Message Entity (ESME) 142. ESME 142 may be any computing device or telecommunications component capable of performing the functions of ESME 142 as described herein. ESME 142 may receive the emergency communication and process it to determine if other parties or devices should be contacted, as described in more detail herein in regard to FIG. 2. In one embodiment, the emergency communication transmitted from device 110 is a standard emergency message, such as a voice call to "911." In such an embodiment, ESME 142 may be configured to recognize emergency calls, and perform processing based on such calls. The emergency communication may be transmitted by ESME 142 to Public Safety Answering Point (PSAP) 138. As is known to those skilled in the art, PSAP 138 may be the agency, typically operated by a government, that is responsible for responding to emergency communications and 911 calls.

In another embodiment, the emergency communication transmitted from device 110 may be a specific message created by device 110 upon activation of an emergency input that is recognized by ESME 142. ESME 142 may, upon receipt of such a message, process the message and send a traditional emergency communication to one or more emergency services providers through PSAP 138.

In one embodiment, ESME 142 may determine that other devices or entities are associated with emergency communications originating from device 110. The user of device 110, or some other person associated with the device, such as the device account holder or the person responsible for payment for use of device 110, may request that certain other device, persons, or entities be contacted in the event that an emergency communication is transmitted from device 110. For example, device 110 may be a device that is used by a child. The child's parent(s) may wish to be contacted immediately if an emergency communication is placed from device 110. The associated devices may be associated with the telephone number of device 110, a user name or other user identifier, or any other identification means. Many means and methods of identifying and associating communications devices and users are known to those skilled in the art, and all such means and methods are contemplated as within the scope of the present disclosure.

In such an embodiment, ESME 142 may determine that two other devices are associated with emergency communications transmitted from device 110. These devices may be device 112 and device 114, which may be wireless devices associate with the child's parents. When the emergency communication is received at ESME 142, ESME 142 may transmit text messages to device 112 and/or device 114 indicating that device 110, or the user of device 110, has initiated an emergency communication. Such text messages may sent through MSC 134 to Short Message Service Center (SMSC)

132 and GMSC Gateway 130 (both of which are described in more detail herein) to be transmitted to device 112 and/or device 114. The text messages may contain any useful information, including identification of the device or user transmitting the emergency communication, a telephone number to call for more information or to be bridged onto an emergency call, and/or a webpage with location information for device 110. Any such information, and any other information which may be useful or informative, is contemplated as within the scope of the present disclosure.

Alternatively, a voice message may be sent to device 112 and/or device 114. In another alternative, a short message service (SMS) message or a multimedia message service (MMS) message may be sent to device 112 and/or device 114. Such messages may also contain any useful information as described above. In yet another alternative, a live operator may be connected, directly or indirectly by ESME 142, to device 112 and/or device 114. In still another embodiment, instant messages may be sent to device 112 and/or 114. Such communications may be transmitted to device 112 and/or device 114 from network 120, using network elements as described herein or any other network elements. In yet another alternative, an emergency multimedia message, such as a video containing information about the emergency and/or instructions on how to acquire more information about the emergency may be sent to device 112 and/or device 114. In yet another embodiment, voice calls may be placed to device 112 and/or device 114 that, when answered by device 112 and/or device 114, may connect device 112 and/or device 114 directly to an ongoing emergency call initiated by device 110. In still another embodiment, a multimedia or other communication may be transmitted to device 112 and/or device 114 that, when answered or activated by device 112 and/or device 114, may connect device 112 and/or device 114 directly to a video conference.

In one alterative embodiment, wired device 116 may be contacted by ESME 142. ESME 142 may be configured to communicate through Public Switched Telephone Network (PSTN) 150. ESME 142 may send a voice message, text message, instant message, or connect a live operator, to any device that can communicate over PSTN 150. Any type of communication, any type of device capable of receiving such communications, and combination thereof, is contemplated as within the scope of the present disclosure.

Information regarding the emergency communication may be provided to Emergency Service Center (ESC) 140 by ESME 142. ESC 140 may facilitate contact of associated devices and/or users with the user and/or device transmitting an emergency communication. It is contemplated that a communication sent to a device regarding an emergency communication transmitted from device 110 may include a telephone number that may be used to contact ESC 140. For example, a communication sent to device 112 may include a telephone number that, when dialed from device 112 may connect device 112 to ESC 140. ESC 140 may process the incoming call and determine that device 112 is associated with the emergency communication transmitted from device 110, and take one or more corresponding actions.

In one embodiment, such a corresponding action may be to connect device 112 to an emergency call in progress between device 110 and PSAP 138. This may allow a concerned party, such as a parent, to provide information to emergency personnel regarding the user of device 110, such as a child. In another embodiment, ESC 140 may connect an incoming call from device 112 to an operator who may facilitate connection to the emergency call, or provide other services or information.

In another embodiment, a telephone number may be provided to device 112, 114, and/or 116 which, when dialed, does not connect to ESC 140, but does connect these devices directly to an emergency call in progress. Similarly, a telephone number provided to device 112, device 114, and/or device 116 may connect these devices to alternate emergency personnel, operators, or any other parties without connecting to ESC 140. In yet another embodiment, a link or control may be provided in the communication transmitted to device 112, device 114, and/or device 116 which, when activated, causes the device activating the link to dial a visible or hidden number which may connect the device to any of the entities or systems described herein. Any numbers, links, controls, or any other means or methods of connecting a device to an entity or party, and any combination thereof, are contemplated as within the scope of the present disclosure.

In another embodiment, information regarding the emergency communication may be used by ESC 140 to provide further information to devices or parties associated with device 110. For example, location information for device 110 may be provided to ESC 140, which then may generate a webpage providing such location information. The communication sent to device 112, device 114, and/or device 116 may include a link to the webpage. The webpage may also, or instead, include information about how to contact the relevant emergency services provider(s), the time and date of the emergency transmission, and/or any other information which may be useful or informative to a party associated with device 110.

It is contemplated that any or all of the above functions may be performed by device 110 itself. For example, when an emergency communication is placed, or an emergency input is activated, device 110 may configured to transmit an emergency communication to one or more emergency services providers, and transmit one or more additional communications regarding the emergency situation to one or more other devices. Such additional communications may be of any type as mentioned above, and may contain any information as mentioned above. It is also contemplated that device 110 may transmit emergency communications as described above together with directly transmitting communications to associated devices.

Figure 2:
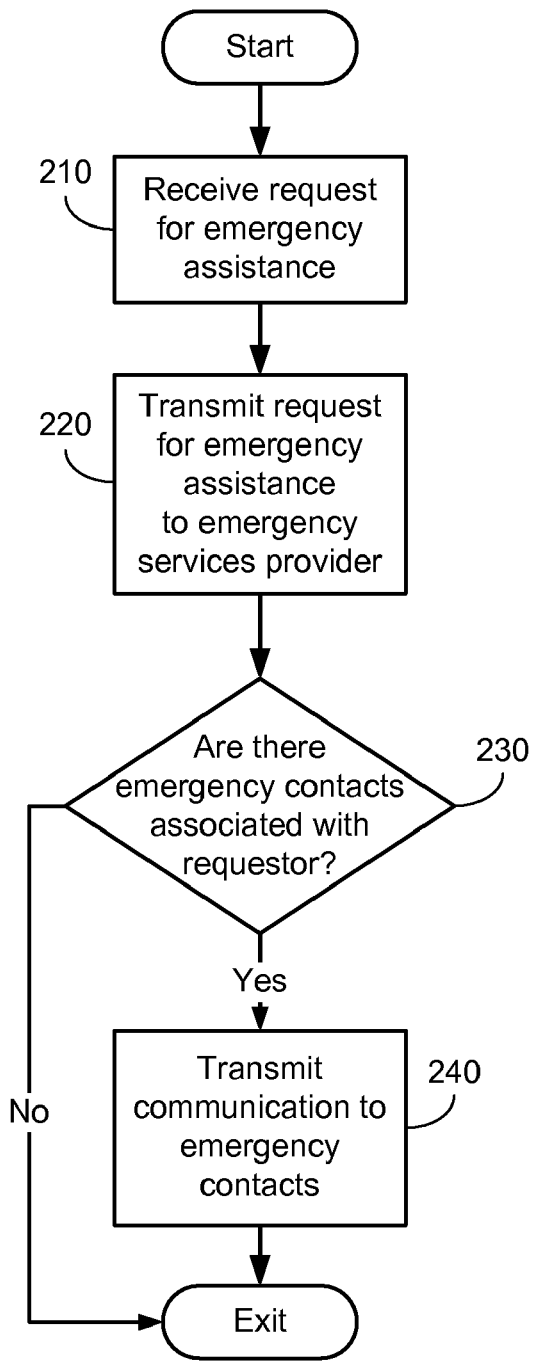
FIG. 2 is a flow diagram of a non-limiting, exemplary method of processing a request for emergency assistance.

FIG. 2 illustrates a non-limiting, exemplary method of processing a request for emergency assistance. The method in FIG. 2 may be performed on a communications device, such as device 110, within a communications network, such as network 120, within devices operating within or in conjunction with a communications network, such as ESME 142 and/or ESC 140, and/or by any combination of such devices and networks. All such configurations are contemplated as within the scope of the present disclosure.

At block 210 a request for emergency assistance is received. This request may be received on a device such as device 110 when a user activates a specific control on a device, or inputs a command or sequence of commands, such as the dialing of "911." Alternatively, the request may be received and detected by network equipment, such as ESME 142, once the request is transmitted from a user device to the network. The request may be a request to establish a voice call, such as the dialing of "911", or it may be a specific emergency request which is detectable by appropriately configured equipment, such as ESME 142.

At block 220, a request for emergency assistance is transmitted to an emergency services provider. Such a request may also include other information that may be useful or informative to an emergency services provider, such as the location of the device transmitting the request, an identifying number and/or user name associated with the device, or any other information. Following the transmission of the request, a call may be established between the user and an emergency services provider.

At block 230, it is determined whether there are contacts associated with the device transmitting the emergency request that should be contacted. As described above, a user or other person associated with a device may request that one or more other devices or parties be contacted in the event that an emergency request is transmitted from the device. The determination performed at block 230 may be performed using any means or methods well known to those skilled in the art.

If there are no associated contacts, then the method is complete. If there associated contacts, then at block 240, a communication is transmitted to those contacts. It is contemplated that an identical communication in the same form may be sent to each contact. For example, the communication may be a standard text message that may be sent to each of the associated contact. Alternatively, the communication sent to each contact may be customized per contact. For example, when a child's wireless device transmits an emergency request, the network receiving the request may be configured to send a text message to the father's wireless device and the mother's wireless device, and a voice message to the child's home telephone. Moreover, the content of the message may vary. For example, the text messages sent to the parents may have a link to a webpage with more information, while the voice message sent to the child's home may provide a telephone number to call with more information. Such a telephone number may result in a direct connection to an ongoing emergency call, or may be to another emergency services provider, operator, or other entity. Text messages or other data messages may be sent which include a link or control that directs the receiving device to call a specific number, thereby allowing the receiving user to quickly and easily call a number for more information.

Any type of information may be contained within the communication send to associated contacts. For example, the geographical location of the device may be determined, for example through the use of GPS devices and equipment or triangulation. This information may be placed on a webpage and a link to the webpage may be included within the communication. Alternatively, or in addition, geographical location information may be included within a voice, text, or instant message that is sent to the associated contacts. Any permutation of content and form of communication transmitted in response to receipt of a request for emergency assistance is contemplated as within the scope of the present disclosure. Once the communications are sent, the method illustrated in FIG. 2 is complete.

It is contemplated that the order of operation of the method illustrated in FIG. 2 may vary. For example, the emergency services provider may be contact before associated contacts are determined. This may be in order to bring the emergency request to the attention of emergency services providers as quickly as possible. Alternatively, the associated contacts may be determined and contacted prior to transmitting the emergency request to an emergency services provider. This may be to ensure that a message gets to an interested party even if the transmission to the emergency services provider fails. In yet another alternative, transmitting the emergency request to an emergency services provider and determining and contacting the associated contacts is performed in parallel, bringing the situation to the notice of both the emergency services provider and the associated contacts as soon as possible. Any order of execution may be performed and the optimal order may be based on the resources available to the network, device, or operator of a system performing this method. All such embodiments are contemplated as within the scope of the present disclosure.

Figure 3:
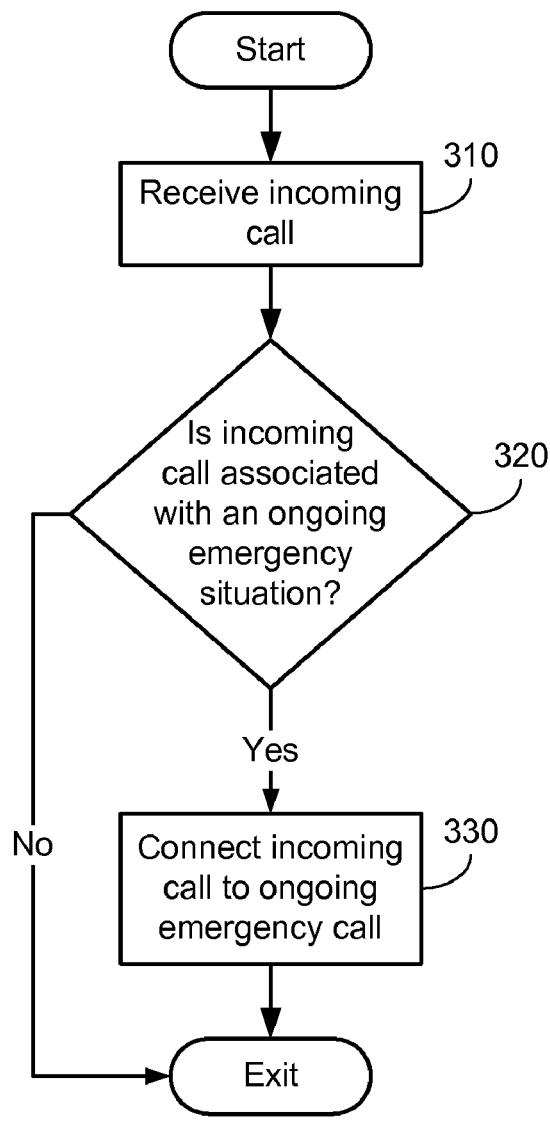
FIG. 3 is a flow diagram of a non-limiting, exemplary method of processing an incoming call.

FIG. 3 illustrates a non-limiting, exemplary method of connecting an incoming call to an emergency call. At block 310, an incoming call may be received. This call may be received at network equipment designed specifically for handling emergency services, such as ESC 140. Alternatively, this call may be received on any other piece of capable network equipment. Such a call may be initiated by a user in response to receiving a message, in one embodiment, as described herein in regard to FIGS. 1 and 2.

At block 320, it may be determined whether the incoming call or device transmitting the incoming call is associated with an ongoing or existing emergency situation. For example, a database look-up may be performed on the incoming caller's telephone number to determine if that telephone number is associated with any devices or numbers that are currently involved in an emergency call. Alternatively, a specific code or sequence may accompany the incoming call. For example, a device, such as the communications device on which the incoming call is initiated or a network device which receives a request to set up or receive the incoming call, may recognize the telephone number to which the incoming call is directed and supplement the call request with a specific code or sequence which identifies the incoming call as one intended for emergency information. Other methods of identifying or labeling an incoming call using means other than the originating telephone number are known to those skilled in the art. All such methods are contemplated as within the scope of the present disclosure. Methods and means of determining data associations are also well known to those skilled in the art and will not be recited herein; however, all such methods and means are contemplated as within the scope of the present disclosure.

If no currently ongoing or existing emergency call or situation is present that may be associated with the incoming call or calling device, the method is complete. If there is an ongoing emergency call or situation, at block 330, the incoming call may be connected to the emergency call. This may allow the incoming caller to obtain information about the emergency situation and the user of the device that initiated the emergency call. This may also allow the incoming caller to provide information which may be useful to an emergency services provider, such as health conditions of the user involved in the emergency, specifics about the situation, or any other such information.

In another embodiment, the incoming call may be connected to an operator or an automated system with more information regarding the emergency situation. In yet another embodiment, the incoming call may be connected to the device that originated the emergency request. Any connection to any other device, or any other form of communication generated in response to the incoming call, is contemplated as within the scope of the present disclosure.

Figure 4:
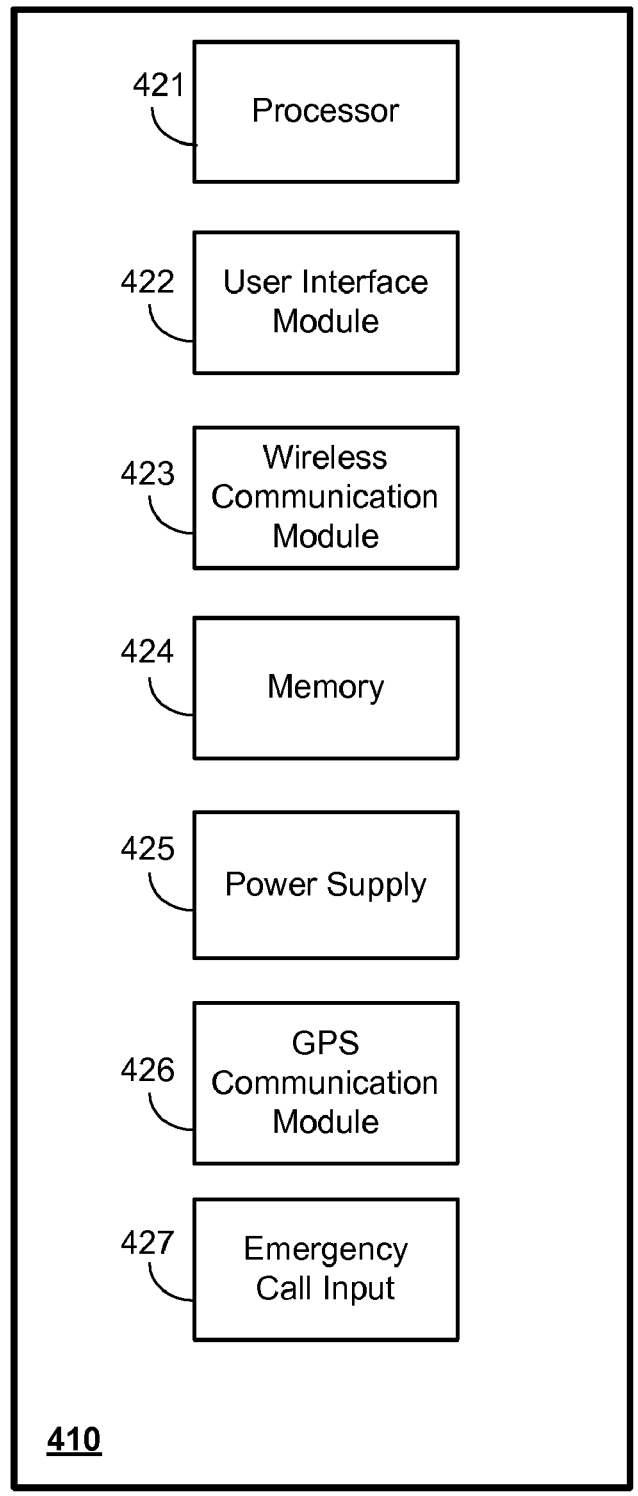
FIG. 4 is a block diagram of a non-limiting, exemplary wireless device that may be used in connection with an embodiment.

FIG. 4 illustrates an example wireless device 410 that may be used in connection with an embodiment. References will also be made to FIG. 1 as appropriate. For example, device 110, device 112, device 114, and/or device 116 may be of the type of device described in regard to FIG. 4, and may have some, all, or none of the components and modules described in regard to FIG. 4. It will be appreciated that the components and modules of wireless device 410 illustrated in FIG. 4 are illustrative, and that any number and type of components and/or modules may be present in wireless device 410. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 421 may be any type of circuitry that performs operations on behalf of wireless device 410. In one embodiment, processor 421 executes software (i.e., computer readable instructions stored in a computer readable medium) that may include functionality related to determining if GPS location information is desirable and obtaining such information, for example. Such software may be a part of or may include, for example, GPS communication module 426, to be discussed below. User interface module 422 may be any type or combination of hardware and/or software that enables a user to operate and interact with wireless device 410. For example, user interface module 422 may include a display, physical and "soft" keys, voice recognition software, microphone, speaker and the like. Wireless communication module 423 may be any type or combination of hardware and/or software that enables wireless device 410 to communicate with, for example, network 120. Memory 424 enables wireless device 410 to store information, such as GPS location information, associated contacts information, emergency services provider contact information, or the like. Memory 424 may take any form, such as internal random access memory (RAM), an SD card, a microSD card and the like. Power supply 425 may be a battery or other type of power input (e.g., a charging cable that is connected to an electrical outlet, etc.) that is capable of powering wireless device 410.

GPS communication module 426 may be any type or combination of hardware and/or software that enables wireless device 410 to communicate with GPS location equipment. In one embodiment, wireless communication module 423 may perform the functions of GPS communication module 426. In an alternative embodiment, GPS communication module 426 may be separate from wireless communication module 423.

Emergency call input 427 may be any type of input, configured in hardware or software, which allows a user to initiate an emergency communication. Emergency call input 427 may be a part of user interface module 422, or may be a separate component. Emergency call input may be the only input on wireless device 410 that can be activated by a user. It is contemplated that wireless device 410 may be a dedicated emergency communication device, with a single input, such as a button, for contacting emergency services providers. Such a device may be particularly useful for children and the elderly or infirm, who otherwise lack the need or ability to operate a fully functional wireless device. The activation of the single emergency input may initiate contact with associated devices and parties, as described herein.

Figure 5:
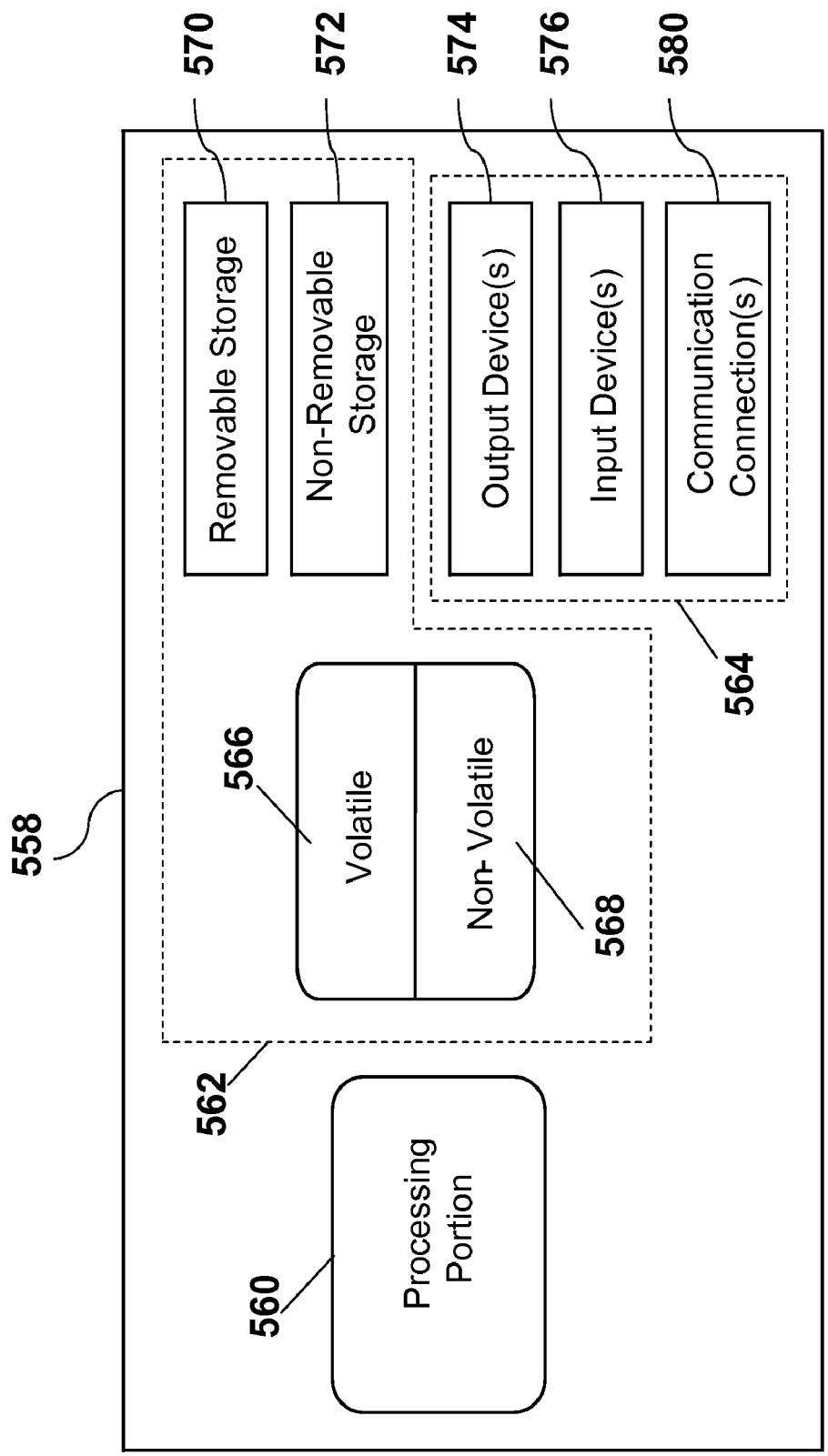
FIG. 5 is a block diagram of a non-limiting, exemplary processor in which the present subject matter may be implemented.

FIG. 5 is a block diagram of an example processor 558 which may be employed in any of the embodiments described herein, including as one or more components of a communications device such as device 110, device 112, device 114, device 116, and/or wireless device 410, and/or as one or more components of communications network equipment or related equipment, such as ESME 142, ESC 140, GMLC 136, MSC 134, LMU 124, and/or SMLC 122. Processor 558 may also be one or more components within network 120. It is emphasized that the block diagram depicted in FIG. 5 is exemplary and not intended to imply a specific implementation. Thus, the processor 558 can be implemented in a single processor or multiple processors. Multiple processors can be distributed or centrally located. Multiple processors can communicate wirelessly, via hard wire, or a combination thereof.

The processor 558 comprises a processing portion 560, a memory portion 562, and an input/output portion 564. The processing portion 560, memory portion 562, and input/output portion 564 are coupled together (coupling not shown in FIG. 5) to allow communications therebetween. The input/output portion 564 is capable of providing and/or receiving components utilized to detect activation of an emergency control, detect incoming emergency calls, determine if there are other contacts associated with an emergency call, and transmit and receive emergency and other communications. For example, the input/output portion 564 is capable of providing/receiving device 110 communications and location information, accepting/receiving requests for emergency services from device 110, transmitting/receiving requests for emergency services, processing requests for emergency services, and executing programs and applications related to the emergency services requests and the determination of devices or parties associated with a device transmitting an emergency services request, or any combination thereof, as described above.

The processor 558 can be implemented as a client processor and/or a server processor. In a basic configuration, the processor 558 may include at least one processing portion 560 and memory portion 562. The memory portion 562 can store any information utilized in conjunction with transmitting, receiving, and/or processing emergency services requests, determining whether there are associated contacts for a requesting device, and transmitting, receiving, and/or processing associated communications. For example, as described above, the memory portion is capable of storing a list of associated contacts and applications and software to determine if communications should be sent to those contacts or if an incoming caller is one of those contacts. Depending upon the exact configuration and type of processor, the memory portion 562 can be volatile (such as RAM) 566, non-volatile (such as ROM, flash memory, etc.) 568, or a combination thereof. The processor 558 can have additional features/functionality. For example, the processor 558 can include additional storage (removable storage 570 and/or non-removable storage 572) including, but not limited to, magnetic or optical disks, tape, flash, smart cards or a combination thereof. Computer storage media, such as memory and storage elements 562, 570, 572, 566, and 568, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 558. Any such computer storage media can be part of the processor 558.

The processor 558 can also contain the communications connection(s) 580 that allow the processor 558 to communicate with other devices, for example through network 120. Communications connection(s) 580 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land-line telephone, and wireless media such as acoustic, RF, infrared, cellular, and other wireless media. The term computer readable media as used herein includes both storage media and communication media. The processor 558 also can have input device(s) 576 such as keyboard, keypad, mouse, pen, voice input device, touch input device, etc. Output device(s) 574 such as a display, speakers, printer, etc. also can be included.

Network 120 of FIG. 1 may comprise any appropriate telephony radio network, or any other type of communications network, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how utilization of IP cellular broadcast to receive multimedia alerts can be incorporated with existing network structures and architectures. It can be appreciated, however, that utilization of IP cellular broadcast systems to receive multimedia alerts can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the techniques of the utilization of SMS, MMS, and/or cellular broadcast to receive multimedia alerts can be applied independently of the method of data transport, and do not depend on any particular network architecture, or underlying protocols.

Figure 6:
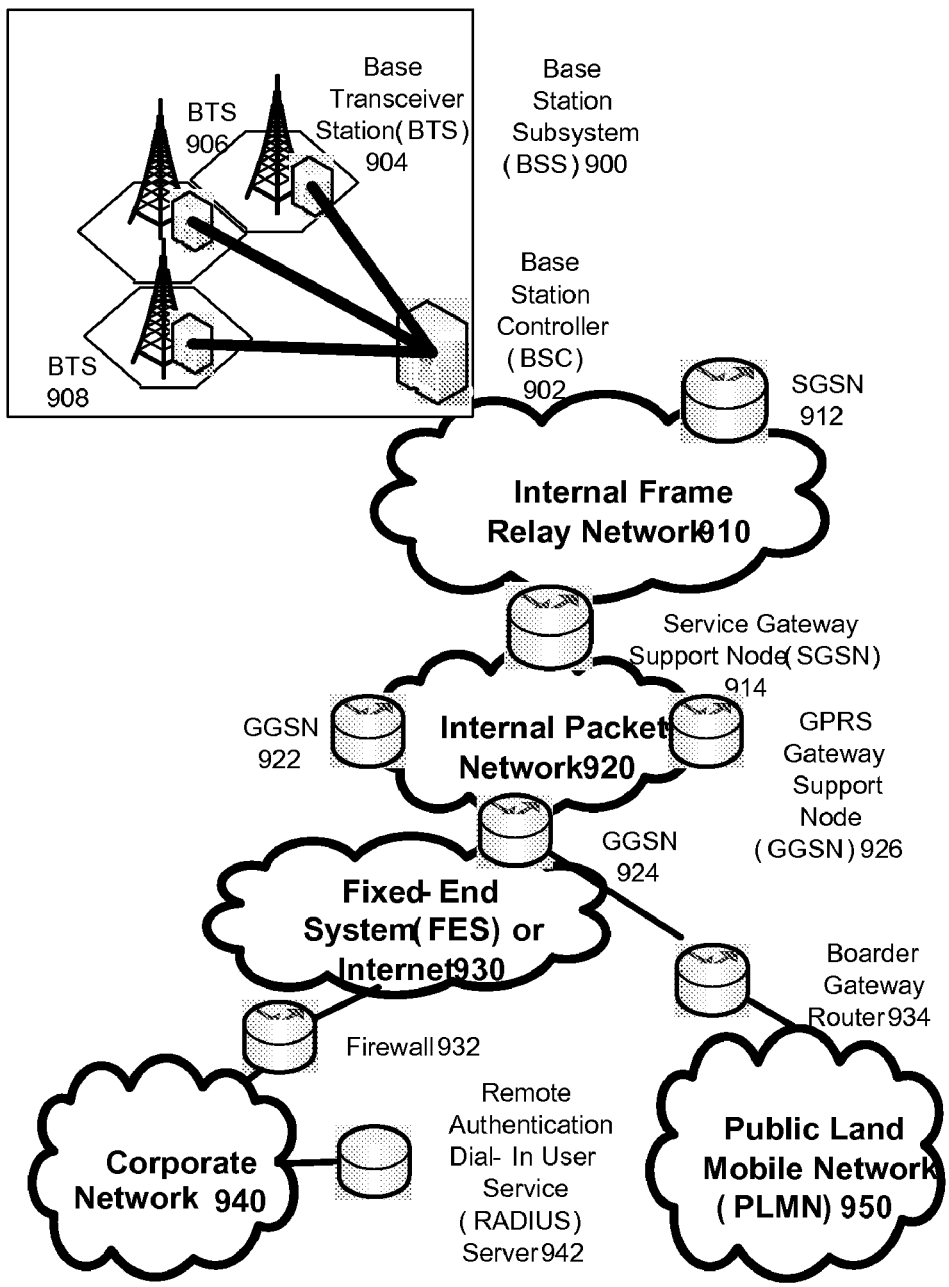
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which utilization of IP cellular broadcast systems to transmit and receive emergency and associated communications can be practiced. In an example configuration, network 120 of FIG. 1 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., device 110, device 112, device 114, device 116 and/or wireless device 410) become connected to the wireless network. In exemplary fashion, the packet traffic originating from user devices (e.g., device 110, device 112, device 114, device 116 and/or wireless device 410) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via boarder gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
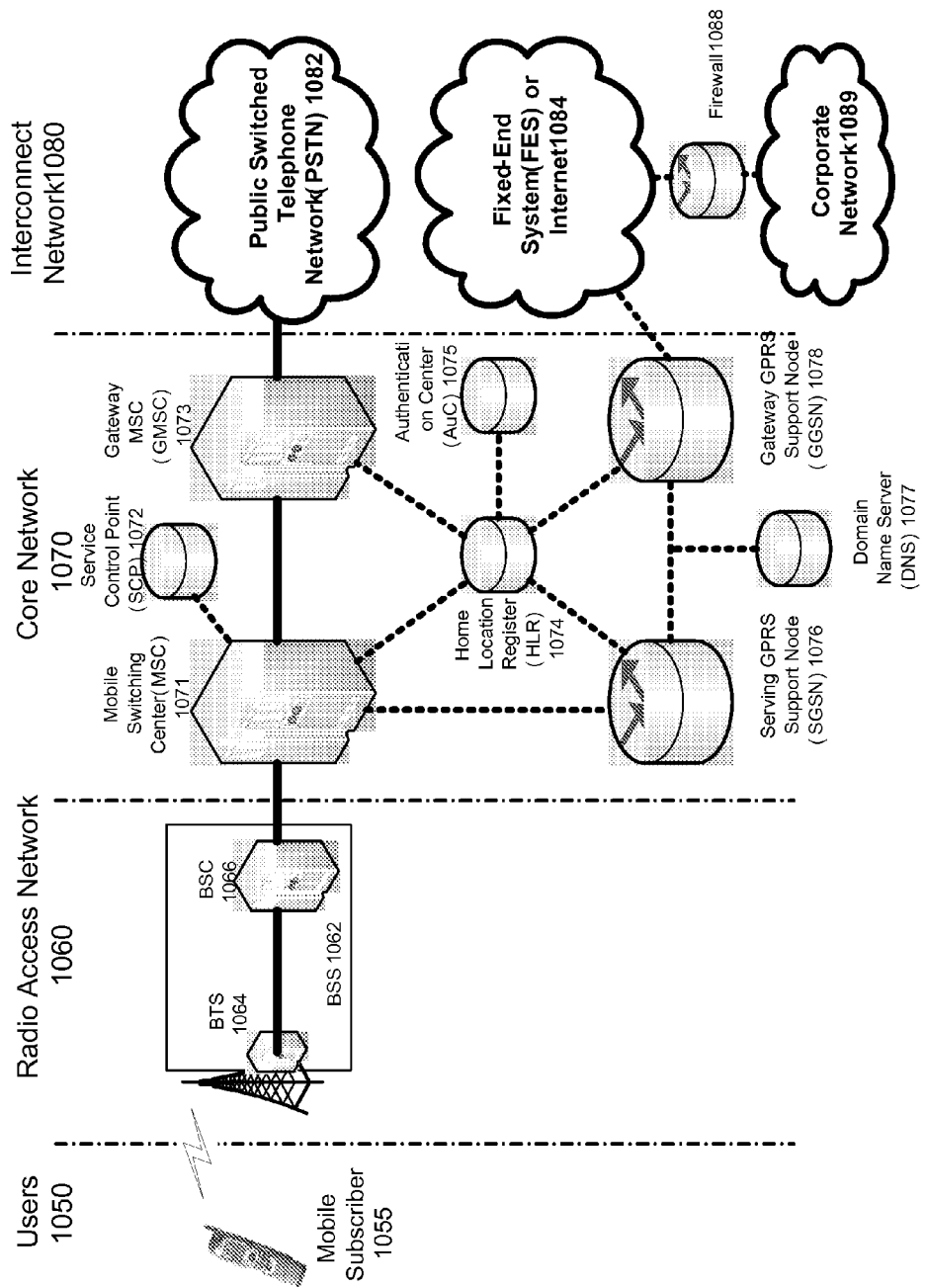
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise device 110, device 112, device 114, device 116 and/or wireless device 410. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as device 110, device 112, device 114, device 116 and/or wireless device 410, used by an end user of the mobile cellular service. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of utilization of IP cellular broadcast systems to receive emergency and associated communications can include but are not limited to Gateway GPRS Support Node tables, Fixed End System router tables, firewall systems, VPN tunnels, and any number of other network elements as required by the particular digital network.

Figure 8:
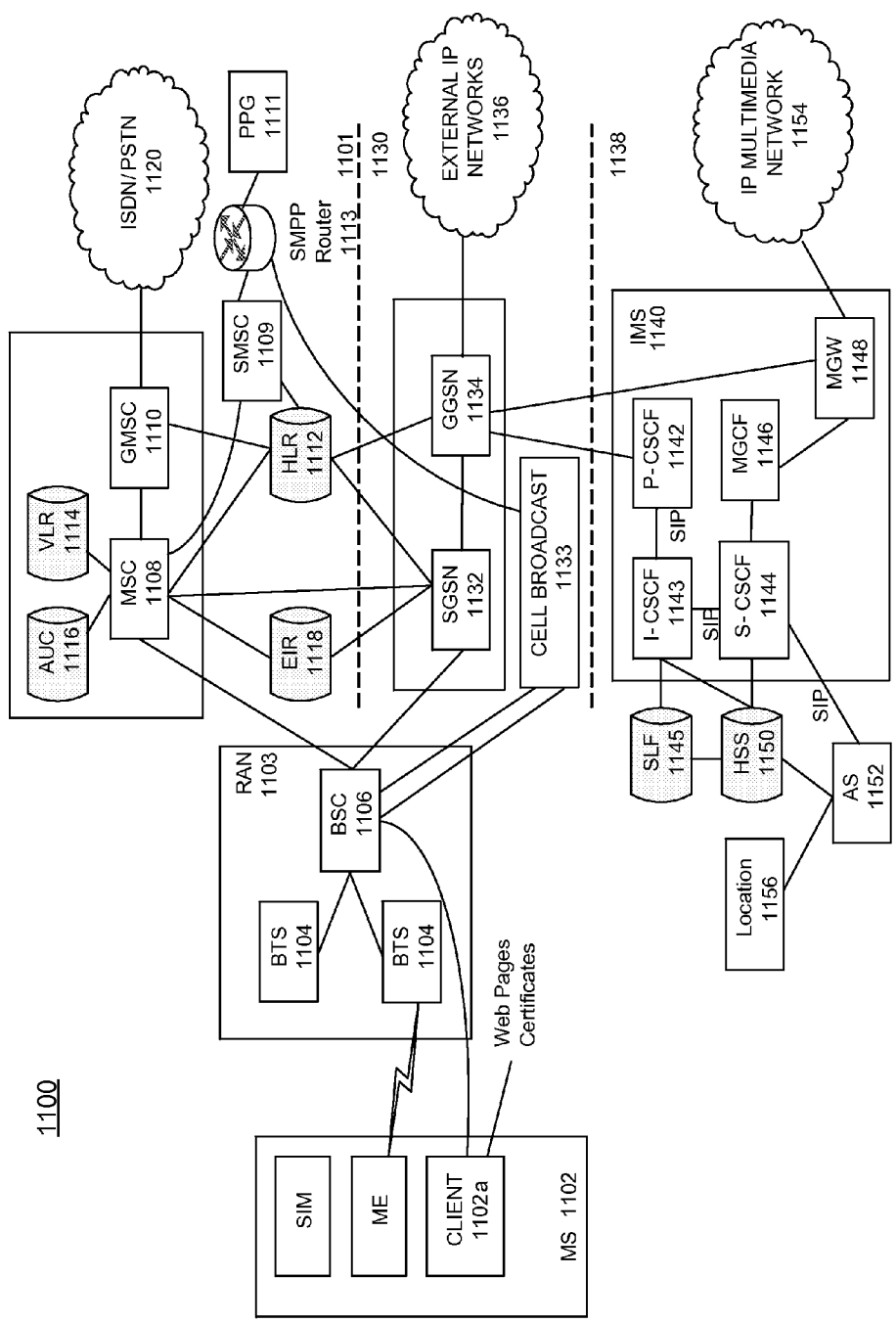
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 with which the utilization of IP cellular broadcast systems to receive multimedia alerts can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., device 110, device 112, device 114, device 116 and/or wireless device 410) that is used by mobile subscribers, with a Subscriber Identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vise versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile and keep track of which core network node is currently handling the subscriber. It may also support subscriber authentication and authorization functions (AAA.) In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of the utilization of IP cellular broadcast systems to receive/transmit emergency requests and associated communications have been described in connection with various computing devices/processor, the underlying concepts can be applied to any computing device, processor, or system capable of utilizing IP cellular broadcast systems to receive/transmit emergency requests and associated communications. The various techniques described herein can be implemented in connection with hardware or software or, where appropriate, with a combination of both. Thus, the methods and apparatuses for the utilization of IP cellular broadcast systems to receive/transmit emergency requests and associated communications, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for the utilization of IP cellular broadcast systems to receive/transmit emergency requests and associated communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for the utilization of IP cellular broadcast systems to receive/transmit emergency requests and associated communications also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for the utilization of IP cellular broadcast systems to receive/transmit emergency requests and associated communications. When implemented on a general-purpose processor, the program code combines with the processor to provide a unique apparatus that operates to invoke the functionality of the utilization of IP cellular broadcast systems to receive/transmit emergency requests and associated communications. Additionally, any storage techniques used in connection with the utilization of IP cellular broadcast systems to receive/transmit emergency requests and associated communications can invariably be a combination of hardware and software.

While the utilization of IP cellular broadcast systems to receive/transmit emergency requests and associated communications has been described in connection with the various embodiments of the various figures, it is to be understood that other similar embodiments can be used or modifications and additions can be made to the described embodiment for performing the same function of utilizing IP cellular broadcast systems to receive/transmit emergency requests and associated communications without deviating therefrom. For example, one skilled in the art will recognize that the utilization of IP cellular broadcast systems to receive/transmit emergency requests and associated communications as described in the present application may apply to any environment, whether wired or wireless, and may be applied to any number of such devices connected via a communications network and interacting across the network. Therefore, the utilization of IP cellular broadcast systems to receive/transmit emergency requests and associated communications should not be limited to any single embodiment, but rather should be construed in breadth and scope in accordance with the appended claims.

What is claimed is:

1. A method comprising:
   detecting, at a mobile wireless communications device, an activation of an emergency control;
   responsive to detecting the activation, transmitting, from the mobile wireless communications device, a first communication indicative of an emergency to an Emergency Service Message Entity in a wireless network,
      wherein the first communication is not a 911 call,
      wherein the first communication comprises an indication for the Emergency Service Message Entity to transmit an emergency communication to an emergency services provider, and
      wherein the first communication comprises an indication for the Emergency Service Message Entity to determine whether any further communications are to be transmitted from the Emergency Service Message Entity regarding the first communication; and
   responsive to detecting the activation, transmitting, from the mobile wireless communications device, a second communication to other than the emergency services provider, wherein the second communication comprises a link to a webpage provided by an Emergency Service Center, wherein the Emergency Service Center receives information regarding the emergency from the Emergency Service Message Entity, and wherein the webpage comprises an indication of a geographical location of the mobile wireless communications device.

2. The method of claim 1, wherein the emergency control is configured on the mobile wireless communications device by a user.

3. The method of claim 1, wherein the second communication comprises a text message.

4. The method of claim 1, wherein the webpage further comprises at least one of contact information for the emergency services provider, a time of the first communication, and a date of the first communication.

5. The method of claim 1, wherein the first communication comprises a text message.

6. The method of claim 1, wherein the second communication is transmitted to a second mobile wireless device.

7. The method of claim 1, wherein the first communication comprises location information of the mobile wireless communications device.

8. The method of claim 7, wherein the second communication is a second voice call, the method further comprising connecting the first voice call and the second voice call.

9. A mobile wireless communications device comprising:
a wireless communication module configured on the mobile wireless communications device that communicates with a communication network; and
an emergency notification input configured on the mobile wireless communications device, wherein, responsive to an activation of an emergency notification input, the wireless communication module:
transmits a first communication indicative of an emergency to an Emergency Service Message Entity in a wireless network,
wherein the first communication is not a 911 call,
wherein the first communication comprises an indication for the Emergency Service Message Entity to transmit an emergency communication to an emergency services provider, and
wherein the first communication comprises an indication for the Emergency Service Message Entity to determine whether any further communications are to be transmitted from the Emergency Service Message Entity regarding the first communication, and
transmits a second communication indicative of the emergency to other than the emergency services provider, wherein the second communication comprises a link to a webpage provided by an Emergency Service Center, wherein the Emergency Service Center receives information regarding the emergency from the Emergency Service Message Entity, and wherein the webpage comprises an indication of a geographical location of the mobile wireless communications device.

10. The mobile wireless communications device of claim 9, wherein the webpage further comprises at least one of contact information for the emergency services provider, a time of the first communication, and a date of the first communication.

11. The mobile wireless communications device of claim 9, wherein at least one of the first communication and the second communication is a text message.

12. The mobile wireless communications device of claim 9, wherein the second communication comprises a telephone number for the emergency services provider.

13. The mobile wireless communications device of claim 9, wherein the second communication comprises a link to a telephone number that, when activated on a recipient device, directs the recipient device to dial the telephone number.

14. The mobile wireless communications device of claim 13, wherein the telephone number is associated with the emergency services provider.

15. The mobile wireless communications device of claim 9, wherein the mobile wireless communications device comprises the emergency notification input and no other user input.

16. A system comprising:
an emergency control configured on a mobile wireless communications device for initiating an emergency communication;
a processor configured on the mobile wireless communications device for determining, responsive to activation of the emergency control, a first device to which a first communication should be transmitted and an Emergency Service Message Entity in a wireless network to which the emergency communication should be transmitted; and
a transmitter configured on the mobile wireless communications device for transmitting, based on the determination, the first communication to the first device and for transmitting the emergency communication to the Emergency Service Message Entity,
wherein the emergency communication is not a 911 call,
wherein the emergency communication comprises an indication for the Emergency Service Message Entity to transmit a request for assistance to an emergency services provider,
wherein the emergency communication comprises an indication for the Emergency Service Message Entity to determine whether any further communications are to be transmitted from the Emergency Service Message Entity regarding the first communication,
wherein the first communication comprises a link to a webpage provided by an Emergency Service Center,
wherein the Emergency Service Center receives information regarding the emergency communication from the Emergency Service Message Entity, and
wherein the webpage comprises an indication of a geographical location of the mobile wireless communications device.

17. The system of claim 16, further comprising:
the processor configured on the mobile wireless communications device for determining, responsive to activation of the emergency control, a second device to which the first communication should be transmitted.

18. The system of claim 16, wherein the first communication comprises a link to a telephone number that, when activated on the first device, directs the first device to dial the telephone number.

19. The system of claim 18, wherein the telephone number is associated with the emergency services provider.

20. The system of claim 16, wherein the first communication comprises the geographical location of the mobile wireless communications device.

21. The system of claim 16, wherein the webpage further comprises at least one of contact information for the emergency services provider, a time of the emergency communication, and a date of the emergency communication.

* * * * *